US012627393B2

(12) United States Patent
Wang et al.

(10) Patent No.: US 12,627,393 B2
(45) Date of Patent: May 12, 2026

(54) METHOD AND APPARATUS FOR CONTROLLING POWER CONSUMPTION OF ONU, ELECTRONIC DEVICE, AND STORAGE MEDIUM

(71) Applicant: ZTE Corporation, Shenzhen (CN)

(72) Inventors: Peng Wang, Shenzhen (CN); Liyong Cai, Shenzhen (CN); Lin Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 264 days.

(21) Appl. No.: 18/575,400

(22) PCT Filed: Jun. 13, 2022

(86) PCT No.: PCT/CN2022/098374
§ 371 (c)(1),
(2) Date: Dec. 29, 2023

(87) PCT Pub. No.: WO2023/273855
PCT Pub. Date: Jan. 5, 2023

(65) Prior Publication Data
US 2024/0313878 A1 Sep. 19, 2024

(30) Foreign Application Priority Data
Jun. 29, 2021 (CN) .......................... 202110725871.X

(51) Int. Cl.
*H04J 14/02* (2006.01)
(52) U.S. Cl.
CPC ................................ *H04J 14/0221* (2013.01)
(58) Field of Classification Search
None
See application file for complete search history.

(56) References Cited

U.S. PATENT DOCUMENTS

2010/0111523 A1 5/2010 Hirth et al.
2011/0318008 A1 12/2011 Kubo et al.
(Continued)

FOREIGN PATENT DOCUMENTS

CN 1859438 A 11/2006
CN 102204131 A 9/2011
(Continued)

OTHER PUBLICATIONS

European Search Report for Application No. 22831675.8, dated Jul. 26, 2024, 7 pages.
(Continued)

*Primary Examiner* — David W Lambert
(74) *Attorney, Agent, or Firm* — CANTOR COLBURN LLP

(57) ABSTRACT

Provided are a method and apparatus for controlling power consumption of an ONU, an electronic device, and a storage medium. The method includes: monitoring a current state of the ONU in real time, wherein the state at least includes a deep energy saving state, and data flow of the ONU in the deep energy saving state is lower than a preset threshold; and performing message processing on received data through a CPU channel and performing a power-off operation on a hardware module in an acceleration channel of the ONU when the ONU is currently in the deep energy saving state; wherein the acceleration channel is connected to a data ingress of the ONU, and the hardware module in the acceleration channel is configured to perform message processing on the received data of the ONU.

16 Claims, 3 Drawing Sheets

(56)                    References Cited

U.S. PATENT DOCUMENTS

2012/0045202  A1*    2/2012   Jiang ..................... H04B 10/40
                                                          398/136
2013/0034355  A1      2/2013   Zhang et al.

FOREIGN PATENT DOCUMENTS

| CN | 102404047 A | 4/2012 |
|----|-------------|--------|
| CN | 106612539 A | 5/2017 |
| EP | 2400680 A1 | 12/2011 |

OTHER PUBLICATIONS

International Search Report for corresponding application PCT/CN2022/098374 filed Jun. 13, 2022; Mail date Aug. 3, 2022.

\* cited by examiner

301

302

Monitoring module

Processing module

Memory

401

Processor

402

METHOD AND APPARATUS FOR CONTROLLING POWER CONSUMPTION OF ONU, ELECTRONIC DEVICE, AND STORAGE MEDIUM

CROSS-REFERENCE TO RELATED APPLICATION

The present disclosure is a national stage filing under 35 U.S.C. § 371 of international application number PCT/ CN2022/098374, filed Jun. 13, 2022, which claims the priority to Chinese patent application no. CN 202110725871.X filed on Jun. 29, 2021, the disclosure of which is incorporated herein by reference in its entirety.

TECHNICAL FIELD

Examples of the disclosure relate to the field of terminal devices, and in particular to a method and apparatus for controlling power consumption of an optical network unit (ONU).

BACKGROUND

With an optical network constantly developed, an optical network unit (ONU), a terminal product, has also been used in a wide range in line with widespread popularization of fiber to the home (FTTH). With ongoing development of a passive optical network (PON) technology and growing demand of users for products, increasing functions of the ONU are fulfilled. For example, a smart home gateway device typically requires multi-core processing and supports Wireless Fidelity (WiFi) 5 or wifi6, a first generation mobile communication (1 G)/2.5 G/10 G network port, a Universal Serial Bus (USB), voices, etc., resulting in a constant increase in power consumption. Generally, the smart home gateway device's power consumption is 6 W or more in a full load running state, and remains high in a standby state without effective power consumption reduction measures.

Operators at home and abroad focus on power consumption of the ONU. China Mobile and China Unicom have set out power consumption test requirements for different scenarios, such as a power consumption capacity in the case of running all services and a power consumption capacity in the case of stopping all services. The European Union divides the ONU into an off-state, an idle-state, and an on-state. Different power consumption levels must be reached in different states. Different operators have different requirements for power consumption of the ONU. The energy saving requirement is also defined in the PON standard. In a passive optical network system, energy saving support capacities in different PON modes vary. In the PON standard, energy saving interrupt and energy saving state machine skipping methods corresponding to different energy saving modes are defined, but no particular solutions have been provided yet.

Therefore, no particular energy saving solution in different energy saving states have been provided in the related art, and there is no way to reduce running power consumption of the ONU effectively.

SUMMARY

Examples of the disclosure provide a method and apparatus for controlling power consumption of an optical network unit (ONU), an electronic device, and a storage medium, so as to effectively reduce running power consumption of the ONU and realize energy saving and emission reduction of an operator network communication system.

In order to solve the above technical problems, a method for controlling power consumption of an ONU is provided in an example of the disclosure. The method includes: monitoring a current state of the ONU in real time, where the current state at least includes a deep energy saving state, and data flow of the ONU in the deep energy saving state is lower than a preset threshold; and performing message processing on received data through a central processing unit (CPU) channel and performing a power-off operation on a hardware module in an acceleration channel of the ONU when the ONU is currently in the deep energy saving state; where the acceleration channel is connected to a data ingress of the ONU, and the hardware module in the acceleration channel is configured to perform message processing on the received data of the ONU; and the CPU channel is a channel established between the data ingress of the ONU and a CPU and is configured to perform message processing on the received data of the ONU through the CPU.

An apparatus for controlling power consumption of an ONU is further provided in an example of the disclosure. The apparatus includes: a monitoring module configured to monitor a current state of the ONU in real time, where the state at least includes a deep energy saving state, and data flow of the ONU in the deep energy saving state is lower than a preset threshold; and a processing module configured to perform message processing on received data through a CPU channel and perform a power off operation on a hardware module in an acceleration channel of the ONU when the ONU is currently in the deep energy saving state; where the acceleration channel is connected to a data ingress of the ONU, and the hardware module in the acceleration channel is configured to perform message processing on the received data of the ONU; and the CPU channel is a channel established between the data ingress of the ONU and a CPU and is configured to perform message processing on the received data of the ONU through the CPU.

An electronic device is further provided in an example of the disclosure. The electronic device includes: at least one processor; and a memory in communication connection to the at least one processor; where the memory stores an instruction executable by the at least one processor, and the instruction causes the at least one processor to execute the above method for controlling power consumption of an ONU when executed by the at least one processor.

A computer-readable storage medium is further provided in an example of the disclosure. The computer-readable storage medium stores a computer program, where the computer program implements the above method for controlling power consumption of an ONU when executed by a processor.

Compared with the prior art, in the example of the disclosure, the current state of the ONU is monitored in real time; and message processing is performed on the received data through the CPU channel, and the hardware module in the acceleration channel of the ONU is powered off when the ONU is monitored to be currently in the deep energy saving state. Since the deep energy saving state is a state corresponding to small service flow, when the ONU enters the deep energy saving state, the CPU can effectively process the small service flow. Accordingly, the received data are directly processed through the CPU channel established between the data ingress of the ONU and the CPU, and the hardware module not required to work in the acceleration channel is powered off. Therefore, power consumption generated through the hardware module in the acceleration channel can be avoided, so that entire running power consumption of the ONU is reduced, and energy saving and emission reduction of an operator network communication system are realized.

BRIEF DESCRIPTION OF THE DRAWINGS

One or more embodiments are illustratively described through figures in the accompanying drawings corresponding to the embodiments. These illustrative descriptions do not constitute a limitation to the embodiments. In the accompanying drawings, elements having the same reference numerals denote similar elements, and the figures in the accompanying drawings do not constitute a limitation in scale unless otherwise stated.

DETAILED DESCRIPTION OF THE EMBODIMENTS

In order to make the objectives, technical solutions, and advantages of examples of the disclosure clearer, all embodiments of the disclosure will be described in detail below with reference to the accompanying drawings. However, those of ordinary skill in the art can understand that in all the embodiments of the disclosure, numerous technical details are set forth for the reader to better understand the disclosure. But, the technical solutions claimed by the disclosure can also be implemented without these technical details and various changes and modifications based on all the following embodiments.

A first example of the disclosure relates to a method for controlling power consumption of an optical network unit (ONU). In the embodiment, a current state of the ONU is monitored in real time, where the state at least includes a deep energy saving state, and data flow of the ONU in the deep energy saving state is lower than a preset threshold; and message processing is performed on received data through a central processing unit (CPU) channel, and a hardware module in an acceleration channel of the ONU is powered off when the ONU is currently in the deep energy saving state; where the acceleration channel is connected to a data ingress of the ONU, and the hardware module in the acceleration channel is configured to perform message processing on the received data of the ONU; and the CPU channel is a channel established between the data ingress of the ONU and a CPU and is configured to perform message processing on the received data of the ONU through the CPU.

Since the deep energy saving state is a state corresponding to small service flow, when the ONU enters the deep energy saving state, the CPU can effectively process the small service flow. Accordingly, the received data are directly processed through the CPU channel established between the data ingress of the ONU and the CPU, and the hardware module not required to work in the acceleration channel is powered off. Therefore, power consumption generated through the hardware module in the acceleration channel can be avoided, so that entire running power consumption of the ONU is reduced, and energy saving and emission reduction of an operator network communication system are realized.

Figure 1:
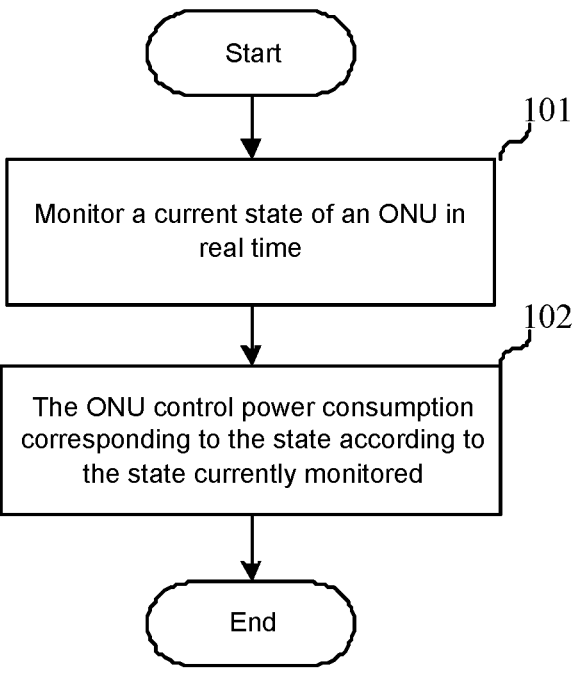
FIG. 1 is a flowchart of a method for controlling power consumption of an optical network unit (ONU) according to an embodiment of the disclosure.

The implementation of the method for controlling power consumption of an ONU in the embodiment is specifically described below. The following content is merely conducive to implementation details of the solution, and is not necessary for the implementation of the solution. A specific flowchart is as shown in FIG. 1, and the method may include:

Step 101, a current state of the ONU is monitored in real time. In an example, the state of the ONU includes a deep energy saving state and an advance energy saving state. Data flow of the ONU in the advance energy saving state is greater than data flow in the deep energy saving state. In another example, the state of the ONU includes: a deep energy saving state, an energy saving state, and an advance energy saving state. The data flow of the ONU in the advance energy saving state is greater than data flow in the energy saving state, and the data flow of the ONU in the energy saving state is greater than the data flow in the deep energy saving state. Different states correspond to different flow thresholds, respectively. The ONU determines the current state according to flow currently measured and a preset flow threshold. In the embodiment, the description is made with the state of the ONU including the deep energy saving state, the energy saving state, and the advance energy saving state as an example. In an example, the deep energy saving state, the energy saving state, and the advance energy saving state correspond to different flow thresholds, respectively. The current state of the ONU is acquired according to data flow currently acquired and a flow threshold corresponding to each state. In another example, the deep energy saving state, the energy saving state, and the advance energy saving state correspond to different time thresholds, respectively. The current state of the ONU is acquired according to current time and a time threshold corresponding to each state. The flow threshold or the time threshold may be acquired from an optical line terminal (OLT), a WEB server, or a network management device. That is, before the step that a current state of the ONU is monitored in real time, configuration information configured to monitor the state in real time may be acquired from the OLT, the WEB server, or the network management device.

Step 102, the ONU controls, according to the state currently monitored, power consumption corresponding to the state.

In an example, message processing is performed on received data through a hardware module in an acceleration channel when the ONU is currently in the advance energy saving state. An upstream module in the acceleration channel asks a downstream module in the acceleration channel to enter a dormancy state or an awakened state according to a working state of the upstream module. Moreover, a correspondence relation between the flow threshold and a chip frequency point may also be preset. In the advance energy saving state, the hardware module in the acceleration channel performs message processing on the received data of the ONU at a chip frequency point determined according to the correspondence relation and the data flow currently measured. The power consumption is preliminarily reduced through energy saving pretreatment measures such as automatic frequency modulation and automatic gating.

In an example, a preset control operation is triggered when the ONU is currently in the energy saving state. The preset control operation includes one or any combination of the following: a fixed frequency reduction, clock shutoff, CPU core shutoff, and a local area network (LAN) port negotiation rate reduction. That is, after the ONU enters the energy saving state, the power consumption of the ONU can be reduced by reducing a working frequency point of a chip to a fixed frequency point, shutting off a clock, shutting off a CPU core, reducing an LAN port negotiation rate, etc.

In an example, message processing is performed on received data through a CPU channel, and the hardware module in the acceleration channel of the ONU is powered off when the state currently monitored is the deep energy saving state. Moreover, before the step that the hardware module in the acceleration channel of the ONU is powered off, configuration information of the hardware module may also be stored.

The method for controlling power consumption of an ONU is described below with the ONU entering the energy saving state from being powered on and then entering the deep energy saving state as an example.

Figure 2:
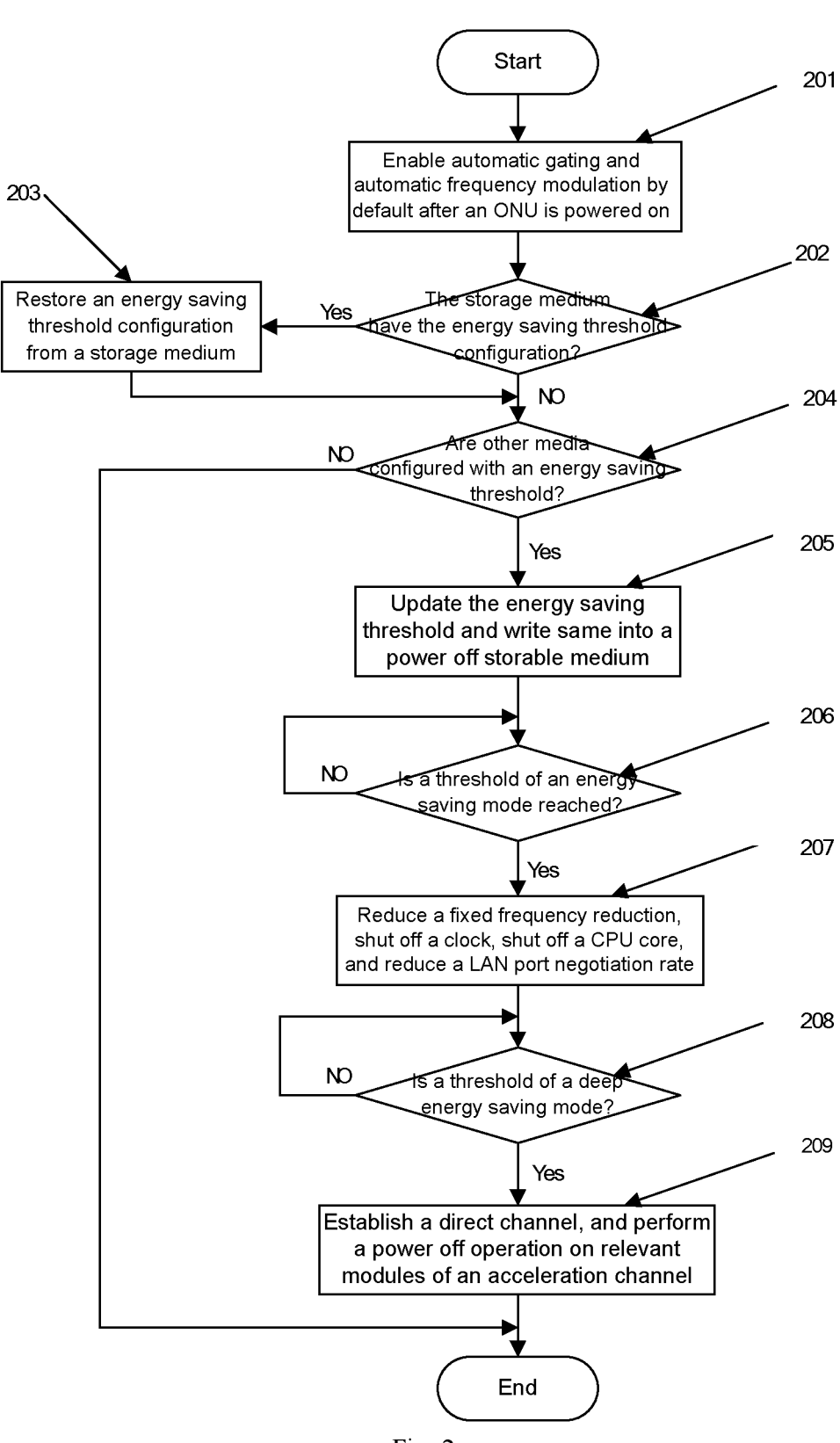
FIG. 2 is a flowchart of controlling power consumption in a process from power on an ONU to entering a deep energy saving state according to an embodiment of the disclosure.

As shown in FIG. 2, in step 201, after the ONU is powered on, automatic frequency modulation and automatic gating are enabled by default, so as to preliminarily reduce the power consumption. Specifically, for the automatic frequency modulation, the correspondence relation between the flow threshold and the chip frequency point is required to be preset. For example, flow threshold r1 corresponds to frequency point f1, flow threshold r2 corresponds to frequency point f2, and flow threshold r3 corresponds to frequency points f3 and f4, where the flow thresholds satisfy r1>r2>r3, and the frequency points satisfy f1>f2>f3>f4. When actual flow is greater than r1, a chip frequency is raised to a highest value f1. When actual flow is greater than r2 and smaller than r1, a chip frequency is reduced to f2. When actual flow is greater than r3 and smaller than r2, a chip frequency is reduced to f3. When actual flow is smaller than r3, a chip frequency is reduced to a lowest value f4. The flow threshold and the frequency point may be dynamically adjusted according to chip support capacities and field application conditions. An adjusted flow threshold and an adjusted frequency are required to be written into a power off storable medium, so that the ONU can be rapidly restored when being powered on next time.

Automatic gating requires the hardware module in the acceleration channel to operate a clock inside the module to work or be dormant according to a signal of the upstream module or a state of the hardware module. For example, the acceleration channel of the chip is divided into module A (such as a data ingress module), module B (such as a data processing module), and module C (such as a data egress module). Module A is positioned upstream of module B. and module B is positioned upstream of module C. When no data are transmitted in the acceleration channel, module A may send a signal to module B to ask module B to enter a dormancy state. Module B detects whether there are data being processed, if not, module B may shut off the clock inside to be dormant, and ask module C to enter the dormancy state simultaneously. When data are transmitted in the acceleration channel, module A is required to send a signal to module B for awakening, and module B enables the clock inside to enter an on-state, and sends a signal to module C for awakening simultaneously.

In step 202, whether the power off storable medium has an energy saving monitoring flow threshold or time threshold configuration is determined; if yes, step 203 is entered; and if not, step 204 is entered.

Step 203: the flow threshold or time threshold configuration in the power off storable medium is restored to that of an energy saving monitoring module.

Step 204: whether the OLT, a WEB page, network management, etc. are configured with an energy saving monitoring flow threshold or time threshold; if yes, step 205 is entered; and if not, the process is ended.

Step 205: the energy saving monitoring module updates the flow threshold or the time threshold, and writes an updated flow threshold or time threshold into the power off storable medium simultaneously, so that the ONU can be rapidly restored after being powered on next time.

Step 206: whether the current flow or time reaches a threshold of an energy saving mode is determined; if yes, it indicates that the energy saving state is entered, and step 207 is executed; and if not, monitoring is continued.

Specifically, energy saving monitoring includes a flow monitoring mode and a time monitoring mode. For flow monitoring, the energy saving mode is primarily controlled to be enabled or disenabled through the flow threshold. The flow threshold may be flow of a PON port, an LAN port, or a wireless fidelity (WIFI) port. The flow threshold is typically smaller than lowest flow thresholds of the automatic frequency modulation, such as flow thresholds R1 and R2, where R1>R2. When actual flow is greater than R1, the ONU is in the advance energy saving state. When actual flow is greater than R2 and smaller than R1, the ONU is in the energy saving state. When actual flow is smaller than R2, the ONU enters the deep energy saving state. The flow threshold may be configured through the OLT, WEB page, network management, etc. When being configured through the OLT, the flow threshold may be issued through private ONU management and control interface (OMCI) message or a physical layer operation administration and maintenance (PLOAM) message. After configuration, the flow threshold is required to be written into the power off storable medium, so that the ONU can be quickly restored after being powered on next time.

For time monitoring, the energy saving mode is primarily controlled to be enabled or disenabled through the time threshold. For example, time threshold T1 is 8:00 in the morning, time threshold T2 is 10:00 in the evening, and time threshold T3 is 12:00 in the evening. When actual time is later than T1 and earlier than T2, the ONU disenables the energy saving mode, that is, the advance energy saving state is entered. When actual time is later than T2 and earlier than T3, the ONU enables the energy saving mode, that is, the energy saving state is entered. When actual time is later than T3 and earlier than T1, the ONU enters the deep energy saving state. T1. T2, and T3 may be set annually, quarterly, or monthly. For example, T1. T2, and T3 are time thresholds in January, and time thresholds in February may be additionally set as T4. T5. T6, etc. Time threshold may be configured through the OLT. WEB page, network management, etc. When being configured through the OLT, the time threshold may be issued through a private OMCI message or a PLOAM message. After configuration, the time threshold is required to be written into the power off storable media, so that the ONU can be rapidly restored after being powered on next time.

In step 207, after entering the energy saving state, the ONU is required to undergo energy saving processing. Energy saving processing may be one or a combination of various ways of a fixed frequency reduction, clock shutoff. CPU core shutoff, and an LAN port negotiation rate reduction.

Specifically, a frequency after the fixed frequency reduction is typically lower than a lowest frequency point of the automatic frequency modulation. When the fixed frequency reduction is enabled, the automatic frequency modulation is disenabled, and the chip works fixedly at the frequency point. The ONU typically supports multi-mode and multi-core processing, and is enabled in a certain fixed mode. A PON clock in other modes may still be in an enabled state. The power consumption can be reduced by shutting off the PON clock in different modes. When a universal serial bus (usb) or wifi is not in an on-state, a usb clock or a wifi clock may also be shut off. After the ONU enters the energy saving state, the service flow is small, no multi-core processing is required typically. A current service and a thread may be concentrated on one CPU core, and other CPU cores may be shut off to reduce the power consumption. The power consumption is reduced by reducing the LAN port negotiation rate. For example, a current negotiation rate of a 10 G LAN port is 10 G. After the ONU enters the energy saving state, service flow of the 10 G LAN port is typically far lower than the negotiation rate. The negotiation rate of the 10 G LAN port may be reduced to 100 M. For example, when there is no data flow at the LAN port continuously, the LAN port may also be shut off to reduce the power consumption.

In step 208, whether the current flow or time reaches a threshold of a deep energy saving mode is determined; if yes, step 209 is entered; and if not, monitoring is continued.

Step 209: a CPU direct channel is established, and a key configuration of the acceleration channel is stored to the power off storable medium or a power off non-storable medium. Then a power supply of a related module in the acceleration channel is cut off, so as to further reduce the power consumption. The ONU typically supports two data processing paths, the acceleration channel and the CPU channel. The two data processing paths go through different modules. The acceleration channel is typically configured for data processing of a large-flow service to reduce CPU resource consumption. The CPU channel is typically configured for protocol message processing and has a lower data processing capacity than the acceleration channel.

After the ONU enters the deep energy saving state, service flow is small, the CPU may also perform effective processing, and the direct channel may be established between an ingress module and the CPU. For example, after receiving data or protocol messages, a PON ingress module, an LAN ingress module, and a wifi ingress module send the data or protocol messages directly to the CPU through the direct channel for processing. After processing the data or the protocol messages completely, the CPU sends processed data or protocol messages to different egress modules through the direct channel. After the direct channel is established, the acceleration channel is in an idle-state, and relevant modules of the acceleration channel may be powered off to realize deep energy saving. Before power off, the key configuration is required to be stored to the power off storable medium or the power off non-storable medium. After the ONU exits the deep energy saving state, it is required to close the direct channel and reconfigure the key configuration stored in the storage medium to the acceleration module, so as to resume normal service processing.

The method for controlling power consumption of an ONU according to the example primarily includes: the current state is monitored, message processing is performed on the data received in the deep energy saving state through the CPU channel, and the hardware module in the acceleration channel of the ONU is powered off, so that the power consumption is reduced by performing a power-off operation on the hardware module in an off state. In the energy saving state, the power consumption of the ONU is reduced by reducing the working frequency point of the chip to one fixed frequency point, shutting off the clock, shutting off the CPU core, or reducing the LAN port negotiation rate. In the advance energy saving state, the power consumption is preliminarily reduced through energy saving pretreatment measures such as automatic frequency modulation and automatic gating. Accordingly, the running power consumption of the ONU is effectively reduced, and energy saving and emission reduction of an operator network communication system are realized.

The steps of the method in the embodiment are divided merely for clarity of description. The steps may be combined into one step or some steps may be split into a plurality of steps during implementation, and they all fall within the scope of protection of the patent as long as the same logical relation is included. The addition of insignificant modifications to an algorithm or process or the introduction of insignificant designs without changing the core designs of the algorithm and process falls within the scope of protection of the patent.

Figure 3:
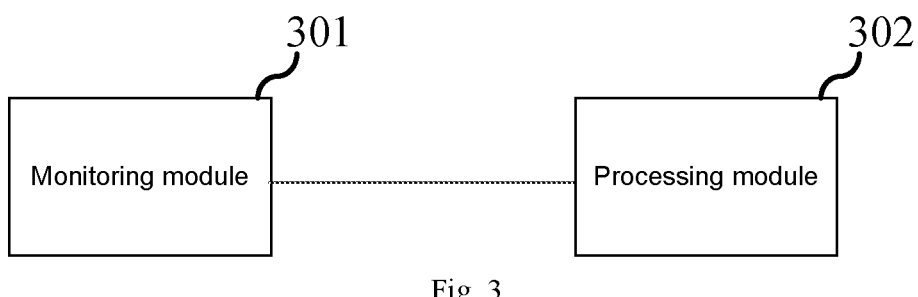
FIG. 3 is a schematic structural diagram of an apparatus for controlling power consumption of an ONU according to an embodiment of the disclosure.

An embodiment of the disclosure relates to an apparatus for controlling power consumption of an ONU. As shown in FIG. 3, the apparatus includes:

a monitoring module 301 configured to monitor a current state of the ONU in real time, where the state at least includes a deep energy saving state, and data flow of the ONU in the deep energy saving state is lower than a preset threshold; and a processing module 302 configured to perform message processing on received data through a CPU channel and perform a power off operation on a hardware module in an acceleration channel of the ONU when the ONU is currently in the deep energy saving state; where the acceleration channel is connected to a data ingress of the ONU, and the hardware module in the acceleration channel is configured to perform message processing on the received data of the ONU; and the CPU channel is a channel established between the data ingress of the ONU and a CPU and is configured to perform message processing on the received data of the ONU through the CPU.

In an example, the state further includes an advance energy saving state, and data flow of the ONU in the advance energy saving state is greater than the data flow in the deep energy saving state. The processing module 302 is further configured to perform message processing on received data through the hardware module in the acceleration channel when the ONU is currently in the advance energy saving state. An upstream module in the acceleration channel asks a downstream module in the acceleration channel to enter a dormancy state or an awakened state according to a working state of the upstream module. Moreover, a correspondence relation between a flow threshold and a chip frequency point may also be preset. The processing module 302 is further configured to control the hardware module in the acceleration channel to perform message processing on the received data of the ONU at a chip frequency point determined according to the correspondence relation and data flow currently measured when the ONU is currently in the advance energy saving state.

In an example, the state further includes an energy saving state. The data flow of the ONU in the advance energy saving state is greater than data flow in the energy saving state, and the data flow of the ONU in the energy saving state is greater than the data flow in the deep energy saving state. The processing module 302 is further configured to trigger a preset control operation when the ONU is currently in the energy saving state. The preset control operation includes one or any combination of the following: a fixed frequency reduction, clock shutoff, CPU core shutoff, and a local area network (LAN) port negotiation rate reduction.

In an example, the deep energy saving state, the energy saving state, and the advance energy saving state correspond to different flow thresholds, respectively. The monitoring module 301 is specifically configured to acquire data flow of the ONU and acquire the current state of the ONU according to the data flow acquired and the flow threshold corresponding to the state.

In an example, the deep energy saving state, the energy saving state, and the advance energy saving state correspond to different time thresholds, respectively. The monitoring module 301 is specifically configured to acquire the current state of the ONU according to current time and a time threshold corresponding to the state.

In the embodiment, the current state of the ONU is monitored in real time; and message processing is performed on the received data through the CPU channel, and the hardware module in the acceleration channel of the ONU is powered off when the ONU is monitored to be currently in the deep energy saving state. Since the deep energy saving state is a state corresponding to small service flow, when the ONU enters the deep energy saving state, the CPU can effectively process the small service flow. Accordingly, the received data are directly processed through the CPU channel established between the data ingress of the ONU and the CPU, and the hardware module not required to work in the acceleration channel is powered off. Therefore, power consumption generated through the hardware module in the acceleration channel can be avoided, so that entire running power consumption of the ONU is reduced, and energy saving and emission reduction of an operator network communication system are realized.

It can be readily found that the embodiment is an apparatus example corresponding to the above method example, and the embodiment may be implemented in mutual cooperation with the above method example. The relevant technical details mentioned in the above method example are still valid in the embodiment. Accordingly, the relevant techniques mentioned in the embodiment may also be applied to the above method example.

Figure 4:
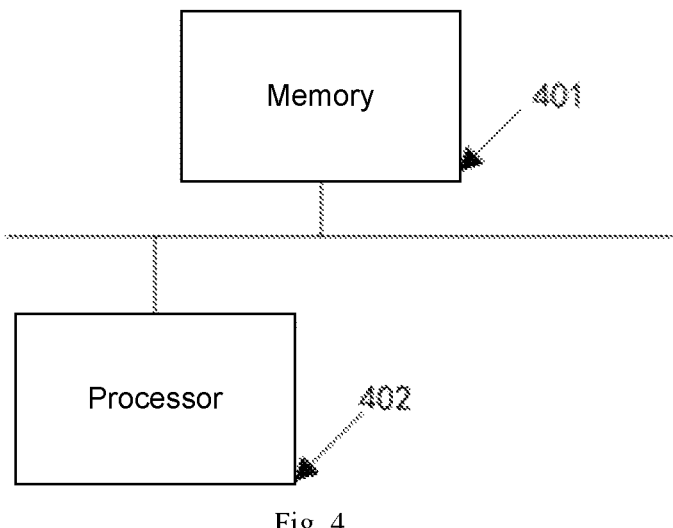
FIG. 4 is a schematic structural diagram of an electronic device according to an embodiment of the disclosure.

An embodiment of the disclosure relates to an electronic device. As shown in FIG. 4, the electronic device includes: at least one processor 402; and a memory 401 in communication connection to at least one processor 402; where the memory 401 stores an instruction executable by at least one processor 402, and the instruction causes at least one processor 402 to execute the above method for controlling power consumption of an ONU when executed by at least one processor 402.

The memory 401 and the processor 402 are connected through a bus. The bus may include any number of interconnected buses and bridges. The bus connects various circuits of one or more processors 402 and the memory 401 together. The bus may also connect various other circuits together, such as peripheral devices, voltage regulators, and power management circuits. These are well known in the art and therefore will not be described further herein. A bus interface provides an interface between the bus and a transceiver. The transceiver may be one or more elements, for example, a plurality of receivers and a plurality of transceivers providing units configured to communicate with various other apparatuses over a transmission medium. The data processed through the processor are transmitted over a wireless medium via an antenna. Further, the antenna further receives the data and transmits the data to the processor.

The processor is responsible for managing the bus and general processing, and may also provide various functions, including timing, peripheral interfaces, voltage regulation, power management, etc. The memory may be configured to store data used by the processor in executing operations.

The above product may execute the method according to the example of the disclosure, and has corresponding functional modules and beneficial effects for executing the method. Reference may be made to the method according to the example of the disclosure for technical details not described in detail in the example.

A computer-readable storage medium is further provided in an example of the disclosure. The computer-readable storage medium stores a computer program. The computer program implements the above method example when executed by a processor.

Those skilled in the art can understand that all or some steps implementing the above method example may be accomplished by instructing related hardware through the program. The program is stored in a storage medium and includes several instructions configured to enable a device (which may be a microcontroller, chip, etc.) or processor to execute all or some steps of the method in each example of the disclosure. The foregoing storage medium includes: various media capable of storing a program code, such as a universal serial bus (USB) flash disk, a mobile hard disk, a read-only memory (ROM), a random access memory (RAM), a magnetic disk, or an optical disk.

The above examples are provided for those of ordinary skill in the art to implement and use the disclosure. Those of ordinary skill in the art can make various modifications or changes to the above examples without departing from the inventive idea of the disclosure. Therefore, the scope of protection of the disclosure is not limited by the above examples, but should conform to the widest scope of the innovative features mentioned in the claims.

What is claimed is:

1. A method for controlling power consumption of an optical network unit (ONU), comprising:

monitoring a current state of the ONU in real time, wherein the state at least comprises a deep energy saving state, and data flow of the ONU in the deep energy saving state is lower than a preset threshold; and when the ONU is currently in the deep energy saving state, performing message processing on received data through a central processing unit (CPU) channel and performing a power-off operation on a hardware module in an acceleration channel of the ONU; wherein the acceleration channel is connected to a data ingress of the ONU, and the hardware module in the acceleration channel is configured to perform message processing on the received data of the ONU; and the CPU channel is a channel established between the data ingress of the ONU and a CPU and is configured to perform message processing on the received data of the ONU through the CPU;

wherein the state further comprises an advance energy saving state, and data flow of the ONU in the advance energy saving state is greater than the data flow in the deep energy saving state; and the method further comprises:

performing message processing on the received data through the hardware module in the acceleration channel when the ONU is currently in the advance energy saving state; wherein an upstream module in the acceleration channel asks a downstream module in the acceleration channel to enter a dormancy state or an awakened state according to a working state of the upstream module.

2. The method for controlling power consumption of an ONU according to claim 1, further comprising:

presetting a correspondence relation between a flow threshold and a chip frequency point; and performing, by the hardware module in the acceleration channel, message processing on the received data of the ONU at a chip frequency point determined according to the correspondence relation and data flow currently measured when the ONU is currently in the advance energy saving state.

3. The method for controlling power consumption of an ONU according to claim 1, wherein the state further comprises an energy saving state;

the data flow of the ONU in the advance energy saving state is greater than data flow in the energy saving state, and the data flow of the ONU in the energy saving state is greater than the data flow in the deep energy saving state; and a preset control operation is triggered when the ONU is currently in the energy saving state; wherein the preset control operation comprises one or any combination of the following:

a fixed frequency reduction, clock shutoff, CPU core shutoff, a local area network (LAN) port negotiation rate reduction.

4. The method for controlling power consumption of an ONU according to claim 3, wherein the deep energy saving state, the energy saving state, and the advance energy saving state respectively correspond to different flow thresholds; and the monitoring a current state of the ONU in real time comprises:

acquiring data flow of the ONU; and acquiring the current state of the ONU according to the data flow acquired and the flow thresholds corresponding to the states.

5. The method for controlling power consumption of an ONU according to claim 3, wherein the deep energy saving state, the energy saving state, and the advance energy saving state respectively correspond to different time thresholds; and the monitoring a current state of the ONU in real time comprises:

acquiring the current state of the ONU according to current time and the time thresholds corresponding to the states.

6. The method for controlling power consumption of an ONU according to claim 1, wherein before performing a power-off operation on a hardware module in an acceleration channel of the ONU, the method further comprises:

storing configuration information of the hardware module.

7. The method for controlling power consumption of an ONU according to claim 1, wherein before the monitoring a current state of the ONU in real time, the method further comprises:

acquiring configuration information configured to monitor the state in real time from an optical line terminal (OLT), a WEB server, or a network management device.

8. An electronic device, comprising:

at least one processor; and a memory in communication connection to the at least one processor; wherein the memory stores an instruction executable by the at least one processor, and when executed by the at least one processor, the instruction causes the at least one processor to:

monitor a current state of the ONU in real time, wherein the state at least comprises a deep energy saving state, and data flow of the ONU in the deep energy saving state is lower than a preset threshold; and when the ONU is currently in the deep energy saving state, perform message processing on received data through a central processing unit (CPU) channel and perform a power-off operation on a hardware module in an acceleration channel of the ONU; wherein the acceleration channel is connected to a data ingress of the ONU, and the hardware module in the acceleration channel is configured to perform message processing on the received data of the ONU; and the CPU channel is a channel established between the data ingress of the ONU and a CPU and is configured to perform message processing on the received data of the ONU through the CPU;

wherein the state further comprises an advance energy saving state, and data flow of the ONU in the advance energy saving state is greater than the data flow in the deep energy saving state, the instruction further cause the at least one processor to:

perform message processing on the received data through the hardware module in the acceleration channel when the ONU is currently in the advance energy saving state; wherein an upstream module in the acceleration channel asks a downstream module in the acceleration channel to enter a dormancy state or an awakened state according to a working state of the upstream module.

9. A non-transitory computer-readable storage medium, storing a computer program, wherein the computer program, when executed by a processor, implements the method for controlling power consumption of an ONU according to claim 1.

10. The electronic device according to claim 8, the instruction further cause the at least one processor to:

preset a correspondence relation between a flow threshold and a chip frequency point; and perform, by the hardware module in the acceleration channel, message processing on the received data of the ONU at a chip frequency point determined according to the correspondence relation and data flow currently measured when the ONU is currently in the advance energy saving state.

11. The electronic device according to claim 8, the instruction further cause the at least one processor to:

the data flow of the ONU in the advance energy saving state is greater than data flow in the energy saving state, and the data flow of the ONU in the energy saving state is greater than the data flow in the deep energy saving state; and a preset control operation is triggered when the ONU is currently in the energy saving state; wherein the preset control operation comprises one or any combination of the following:

a fixed frequency reduction, clock shutoff, CPU core shutoff, a local area network (LAN) port negotiation rate reduction.

12. The electronic device according to claim 11, wherein the deep energy saving state, the energy saving state, and the advance energy saving state respectively correspond to different flow thresholds; and the instruction further cause the at least one processor to:

acquire data flow of the ONU; and acquire the current state of the ONU according to the data flow acquired and the flow thresholds corresponding to the states.

13. The electronic device according to claim 11, wherein the deep energy saving state, the energy saving state, and the advance energy saving state respectively correspond to different time thresholds, and the instruction further cause the at least one processor to:

acquire the current state of the ONU according to current time and the time thresholds corresponding to the states.

14. The electronic device according to claim 8, the instruction further cause the at least one processor to:

store configuration information of the hardware module before a hardware module in an acceleration channel of the ONU is powered off.

15. The electronic device according to claim 8, the instruction further cause the at least one processor to:

acquire configuration information configured to monitor the state in real time from an optical line terminal (OLT), a WEB server, or a network management device before the monitoring a current state of the ONU in real time.

16. A non-transitory computer-readable storage medium, storing a computer program, wherein the computer program, when executed by a processor, implements the method for controlling power consumption of an ONU according to claim 2.

* * * * *